US006562752B2

(12) United States Patent
Kasztelan

(10) Patent No.: US 6,562,752 B2
(45) Date of Patent: *May 13, 2003

(54) METALLIC SULPHIDE CATALYSTS, PROCESSES FOR SYNTHESISING SAID CATALYSTS AND USE THEREOF

(75) Inventor: Slavik Kasztelan, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/741,902

(22) Filed: Dec. 22, 2000

(65) Prior Publication Data

US 2002/0045539 A1 Apr. 18, 2002

Related U.S. Application Data

(63) Continuation-in-part of application No. 09/344,345, filed on Jun. 25, 1999, now abandoned, and a continuation-in-part of application No. 09/344,347, filed on Jun. 25, 1999, now abandoned.

(30) Foreign Application Priority Data

Jun. 25, 1998 (FR) ............................................. 98 08049
Jun. 25, 1998 (FR) ............................................. 98 08045

(51) Int. Cl.$^7$ ......................... B01J 27/04; B01J 27/043
(52) U.S. Cl. ................... 502/216; 502/217; 502/208; 502/209; 502/210; 502/211; 502/202; 502/203; 502/204; 502/206; 502/207; 502/222; 502/223
(58) Field of Search ........................... 502/216, 217, 502/208, 209, 210, 211, 202, 203, 204, 206, 207, 222, 223

(56) References Cited

U.S. PATENT DOCUMENTS

| | | | | |
|---|---|---|---|---|
| 3,592,760 A | * | 7/1971 | Young ..................... 208/111.1 |
| 3,677,970 A | * | 7/1972 | Mertzweiller et al. ...... 502/107 |
| 3,893,947 A | | 7/1975 | Young |
| 3,997,431 A | | 12/1976 | Beuther et al. |
| 4,007,135 A | | 2/1977 | Hayden et al. ............. 502/317 |
| 4,102,822 A | * | 7/1978 | Mulaskey ................... 208/136 |
| 4,105,587 A | * | 8/1978 | Blakely ....................... 208/136 |
| 4,105,589 A | * | 8/1978 | Moser ........................ 502/216 |
| 4,108,761 A | | 8/1978 | Sze et al. ................ 208/254 H |
| 4,171,258 A | | 10/1979 | Gaspar ....................... 208/144 |
| 4,181,602 A | * | 1/1980 | Quick et al. ........... 208/216 PP |
| 4,320,030 A | * | 3/1982 | Happel et al. .............. 502/202 |
| 4,326,991 A | * | 4/1982 | Asaoka et al. .......... 208/251 H |
| 4,491,639 A | * | 1/1985 | Happel et al. .............. 502/204 |
| 4,530,917 A | * | 7/1985 | Berrebi ....................... 502/168 |
| 4,548,920 A | | 10/1985 | Thompson et al. |
| 4,560,804 A | * | 12/1985 | Yeh et al. ................... 568/309 |
| 4,595,672 A | | 6/1986 | Ho et al. .................... 502/219 |
| 4,687,568 A | * | 8/1987 | Kukes et al. ............... 208/217 |
| 4,740,491 A | | 4/1988 | Wise et al. ................. 502/216 |
| 4,824,820 A | | 4/1989 | Jacobson et al. ........... 502/219 |
| 4,945,078 A | | 7/1990 | Erekson et al. ............. 502/202 |
| 4,994,498 A | * | 2/1991 | Kinkade ...................... 502/220 |
| 5,122,258 A | | 6/1992 | Eadie et al. ................. 208/112 |
| 5,173,468 A | * | 12/1992 | Boehning et al. ........... 502/202 |
| 5,206,202 A | | 4/1993 | Lachman et al. |
| 5,338,717 A | | 8/1994 | Aldridge et al. |
| 5,525,740 A | | 6/1996 | Rizkalla ...................... 549/534 |
| 5,629,257 A | | 5/1997 | Umansky et al. ........... 502/216 |
| 5,688,736 A | * | 11/1997 | Seamans et al. ............ 208/112 |
| 5,736,483 A | | 4/1998 | Rizkalla ...................... 502/347 |
| 5,821,191 A | | 10/1998 | Lockemeyer |
| 5,854,167 A | | 12/1998 | Rizkalla et al. ............. 502/216 |
| 5,856,609 A | | 1/1999 | Wu et al. |
| 5,905,053 A | | 5/1999 | Rizkalla et al. ............. 502/216 |
| 6,071,402 A | | 6/2000 | Danot et al. |
| 6,100,216 A | * | 8/2000 | Dufresne et al. ........... 502/216 |
| 6,149,799 A | | 11/2000 | Raybaud et al. |
| 6,242,378 B1 | * | 6/2001 | Kasztelan ................... 502/202 |
| 6,316,382 B1 | * | 11/2001 | Kasztelan ................... 502/202 |
| 6,432,867 B1 | | 8/2002 | Kasztelan |

FOREIGN PATENT DOCUMENTS

| | | | |
|---|---|---|---|
| EP | 0181082 | * | 5/1986 |
| EP | 0 216 472 A1 | | 4/1987 |
| EP | 0 130 850 B1 | | 6/1987 |
| EP | 0 181 254 B1 | | 6/1988 |
| EP | 0 349 358 B1 | | 3/1992 |
| EP | 0 448 435 B1 | | 10/1993 |
| EP | 0 453 367 B1 | | 1/1994 |
| EP | 0 582 403 A1 | | 2/1994 |
| EP | 0 707 890 B1 | | 1/2000 |
| EP | 0 466 568 B1 | | 10/2000 |
| GB | 2036582 | * | 7/1980 |
| WO | 90/05587 | * | 5/1990 |
| WO | WO 92/00141 A1 | | 1/1992 |

OTHER PUBLICATIONS

Otto et al., "Lewis Acid Catalysis of a Diels—Alder Reaction in Water," *J. Am. Chem. Soc.* 1996, 118, pp. 7702–7707. (No Month).

Pindur et al., "Acceleration and Selectivity Enhancement of Diels—Alder Reactions by Special and Catalytic Methods," *Chem. Rev.* 1993, 93, pp. 741–761. (No Month).

Kagan et al., "Catalytic Asymmetric Diels—Alder Reactions," *Chem. Rev.* 1992, 92, pp. 1007–1019. (No Month).

* cited by examiner

*Primary Examiner*—Elizabeth D. Wood
(74) *Attorney, Agent, or Firm*—Millen, White, Zelano & Branigan, P.C.

(57) ABSTRACT

A catalyst containing a sulfide phase comprising (a) sulfur (b) and at least one element A selected form group IIIB, including the lanthanides and actinides, group IVB and group VB, and optionally (c) at least one element B selected from group VIIB and group VIII and mixtures thereof, is suitable for use in, for example, hydrorefining or hydroconversion. Sulfur is present in the catalyst at a quantity higher than the quantity corresponding to 40% of the stoichiometric quantity of sulfur in the sulfide compounds of elements from groups MB, IVB, VB, VIIB and VIII. The catalyst also, optionally, comprises at least one porous amorphous or low crystallinity type matrix.

33 Claims, No Drawings

METALLIC SULPHIDE CATALYSTS, PROCESSES FOR SYNTHESISING SAID CATALYSTS AND USE THEREOF

This is a continuation-in-part of application Ser. No. 09/344,345 filed on Jun. 25, 1999, now abandoned, and application Ser. No. 09/344,347 filed on Jun. 25, 1999, now abandoned.

The present invention concerns a catalyst containing a sulfide phase comprising (a) sulfur (b) and at least one element A selected from the group consisting of group IIIB, including the lanthanides and actinides, group IVB and group VB and optionally (c) at least one element B selected from the group consisting of group VIIB and group VIII and a mixture therof, said sulfur being present in a quantity higher than the quantity corresponding to 40% of the stoichiometric quantity of sulfur in the sulfide compounds of elements from groups IIIB, IVB, VB, VIIB and VIII and optinally at least one porous amorphous or low crystallinity type matrix.

More particularly, the present invention relates to a catalyst containing a multimetallic sulphide phase comprising sulphur and at least one element A selected from the group consisting of elements from group IIIB, including the lanthanides and actinides (group 3 in the new notation for the periodic table: "Handbook of Chemistry and Physics", 76$^{th}$ edition, 1995–1996, inside front cover), and group IVB (group 4), at least one element B selected from the group consisting of elements from group VIIB (7) and group VIII (groups 8, 9 and 10 in the new notation for the periodic table), said mixed sulphide phase optionally being associated with a porous matrix, generally an amorphous or low crystallinity oxide type matrix, optionally at least one element selected from elements from group VB (5), group VIB (6), optionally at least one element selected from the group formed by P, B and Si, and optionally at least one source of anions from group VIIA (group 17).

The present invention also relates to a supported sulphur-containing catalyst for hydrorefining or hydroconversion, containing at least one sulphide of at least one element selected from group IIIB, including the lanthanides and actinides, group IVB, group VB (groups 3, 4, 5 in the new notation for the periodic table: "Handbook of Chemistry and Physics", 76$^{th}$ edition, 1995–1996, inside front cover), associated with at least one porous matrix, generally an amorphous or low crystallinity oxide type matrix. The catalyst can also optionally contain at least one zeolitic or non zeolitic molecular sieve and optionally at least one element from group VIII (groups 8, 9, 10 in the new notation for the periodic table), optionally at least one element selected from the group formed by P, B, Si, and optionally at least one element from group VIIA (group 17). The catalyst comprises a quantity of sulphur such that the degree of sulphurisation is over 40%.

The present invention also relates to the use of the simple sulphides and the mixed sulphides obtained as catalysts for hydrorefining and hydrocracking, for example for hydrogenation, hydrodenitrogenation, hydrodeoxygenation, hydrodearomatization, hydrodesulphurization and hydrodemetallization of hydrocarbon-containing feeds containing at least one aromatic and/or olefinic and/or naphthenic and/or paraffinic type compound, said feeds possibly containing metals and/or nitrogen and/or oxygen and/or sulphur.

Sulphide compounds, and in particular sulphides of transition metals, can be used as catalysts for carrying out hydrotreatment reactions in petroleum refining and in petrochemistry.

Sulphides of transition metals and rare earths (lanthanides) are also used in lubricants, pigments, battery electrodes, materials for sulphur detectors, materials with specific optical properties, additives for luminescent materials, and anti-corrosion coatings in sulphur-containing atmospheres.

In general, the properties of simple sulphides are often improved by the addition of a second element leading to the formation of an intimate association of two elements in the sulphide phase, hereinafter termed a mixed sulphide. As an example, the addition of nickel to molybdenum sulphide substantially improves the catalytic activity of tungsten sulphide for hydrogenation of aromatic compounds (Ahuja, S. P., Derrien, M. L., Le Page, J. F., Industrial Engineering Chemistry Products Research Development, volume 9, pages 272 to 281, 1970). Adding cobalt to molybdenum sulphide substantially improves the activity of the molybdenum sulphide for hydrodesulphurisation of petroleum cuts.

The simple sulphides and the mixed sulphides can be synthesised by a number of methods which are well known to the skilled person.

Crystallised transition metal or rare earth simple or mixed sulphides can be synthesized by reacting transition metal or rare earth type elements with elemental sulphur at high temperature in a process which is well known to the skilled person in the solid state chemistry field but is expensive, in particular as regards industrial application.

The synthesis of simple sulphides and the one of bulk or supported mixed sulphides by reacting a suitable precursor in the form of a mixed oxide of transition metals and/or rare earths impregnated with a sulphur compound in the liquid phase followed by treatment in hydrogen in a traversed bed reactor is well known to the skilled person.

The synthesis of bulk sulphide catalysts or sulphide catalysts supported on a porous matrix by treatment of a bulk oxide precursor or an oxide precursor supported on a porous matrix in hydrogen with a sulphur-containing hydrocarbon feed, in particular sulphur-containing petroleum cuts such as gasoline, kerosene or gas oil, to which a sulphur compound, for example dimethyldisulphide, can optionally be added, is also well known to the skilled person.

Bulk sulphides can also be synthesised by co-precipitation, in a basic medium, of sulphur-containing complexes in solution containing two cations. This method can be carried out at a controlled pH and is termed homogeneous sulphide precipitation. It has been used to prepare a mixed sulphide of cobalt and molybdenum (G. Hagenbach, P. Courty, B. Delmon, Journal of Catalysis, volume 31, page 264, 1973).

Synthesizing bulk sulphide catalysts or sulphide catalysts supported on a porous matrix by treatment of a bulk oxide precursor or an oxide precursor supported on a porous matrix in a hydrogen/hydrogen sulphide mixture or nitrogen/hydrogen sulphide mixture is also well known to the skilled person.

U.S. Pat. No. 4,491,639 describes the preparation of a sulphur-containing compound by reacting elemental sulphur with V, Mo and W salts and in particular V, Mo and W sulphides optionally containing at least one of elements from the series C, Si, B, Ce, Th, Nb, Zr, Ta and U in combination with Co or Ni.

Other methods have been proposed for the synthesis of simple sulphides. As an example, the synthesis of crystallized simple sulphides of rare earths described in U.S. Pat. No. 3,748,095 and French patent FR-A-2 100 551 proceeds by reacting hydrogen sulphide or carbon disulphide with an amorphous rare earth oxide or oxycarbonate at a temperature of over 1000° C.

European patents EP-A-0 440 516 and U.S. Pat. No. 5,279,801 describe a process for synthesizing simple transition metal or rare earth sulphur-containing compounds by reacting a transition metal or rare earth compound with a carbon-containing sulphur compound in the gaseous state, in a closed vessel at a moderate temperature of 350° C. to 600° C.

However, it is well known that certain elements such as group IIIB elements, including the lanthanides and actinides, group IVB elements, and group VB elements, are very difficult to sulphurise. It is also well known that elements from groups IIIB and IVB, in a bulk or supported oxide form, are very difficult to sulphurise in the form of mixed sulphides. The known sulphurisation methods which are routinely used industrially and in the laboratory, such as sulphurisation in a gaseous hydrogen/hydrogen sulphide mixture or liquid phase sulphurisation using a mixture of a hydrocarbon feed and added dimethyldisulphide, are ineffective when sulphurising such solids.

The considerable amount of research carried out by the Applicant on preparing sulphide catalysts based on sulphides of elements from groups IIIB, including the lanthanides and actinides, and group IVB, and numerous other elements of the periodic table, mixed with at least one element selected from group VIIB and group VIII elements, in bulk or associated with a matrix, have led to the discovery that, surprisingly, by reacting a compound of sulphur and carbon containing no hydrogen, such as carbon disulphide $CS_2$, carbon oxysulphide COS, or carbon sulphide CS, with a powder containing at least one element selected from group IIIB, including the lanthanides and actinides, group IVB and at least one element selected from elements from group VB, group VIB, group VIIB and group VIII, in a closed vessel, produces a multimetallic sulphide type compound which may be properly crystalline. Without wishing to be bound by any particular theory, it appears that sulphurisation is produced by decomposition of the carbon sulphide followed by reaction thereof with the compounds of the elements present in the powder forming, from the precursor surface, a sulphide compound which intimately associates the cations, until the precursors are exhausted. Thus the catalysts of the invention contain a quantity of sulphur such that the degree of sulphurisation is over 40%, preferably over 50% and more preferably over 60%.

The term "degree of sulphurisation" as used in the present discussion means the quantity of sulphur fixed on the catalyst with respect to the stoichiometric quantity of sulphur in the metallic sulphide compounds.

Other research studies carried out by the Applicant on preparing sulphide catalysts based on sulphides of elements from groups IIIB, IVB, VB and numerous other elements of the periodic table, used alone or as mixtures, associated with a matrix, have led to the discovery that, surprisingly, by simultaneously reacting elemental sulphur and carbon with a powder containing at least one element selected from group IIIB, including the lanthanides and actinides, group IVB, group VB, and possibly at least one element from group VIII, in a closed or open vessel in an autogenous or inert atmosphere, produces an amorphous or crystalline sulphide compound with a degree of sulphurisation of over 40%. Without wishing to be bound by any particular theory, it appears that sulphurisation is obtained by reducing a precursor compound containing the element or elements selected from group IIIB, including the lanthanides and actinides, group IVB, group VB, and optionally at least one group VIII element, with carbon with simultaneous sulphurisation of the reduced element by the sulphur until the precursor containing the element or elements selected from group IIIB, including the lanthanides and actinides, group IVB, group VB, and optionally at least one group VIII element, is exhausted.

As stated above and according to a first preferred embodiment of the invention, one of the preferred catalyst of the invention contains a multimetallic mixed sulphide phase comprising (a) sulphur (b) and at least one element A selected from the group consisting of elements from group IIIB, including the lanthanides and actinides, group IVB and mixtures thereof and (c) at least one element B selected from the group consisting of elements from group VIIB, group VIII and mixtures thereof, said sulfur being present in a quantity higher than the quantity corresponding to 40% of the stoichiometric quantity of sulfur in multimetallic sulfide compounds of elements from groups IIIB, IVB, VIIB and VIII.

The group IVB elements are selected from titanium, zirconium and hafnium, preferably titanium. The group IIIB elements are selected from yttrium, lanthanum, cerium, praseodymium, neodymium, samarium, europium, gadolinium, terbium, dysprosium, holmium, erbium, thullium, ytterbium, lutetium, actinium, thorium and uranium.

The group VIII elements are selected from nickel, iron, ruthenium, osmium, rhodium, iridium, platinum, palladium and cobalt, preferably cobalt, nickel or iron.

The group VIIB elements are selected from manganese, rhenium and technetium.

The group VIB and VB elements which are optional in this type of preferred catalytic composition are selected from molybdenum, chromium, tungsten, niobium, vanadium and thallium The bulk mixed sulphide catalyst (multimetallic sulphide catalyst) of the present invention generally comprises at least one metal selected from the following groups and in the following amounts, in % by weight with respect to the total catalyst mass:

0.01% to 40%, preferably 0.01% to 35%, more preferably 0.01% to 30%, of at least one metal selected from elements from groups IIIB and IVB, including the lanthanides and actinides (element A);

0.01% to 30%, preferably 0.01% to 25%, of at least one metals selected from groups VIIB and VIII (element B);

0.001% to 30%, preferably 0.01% to 55%, of sulphur; the catalyst optionally containing:

0 to 30%, preferably 0.01% to 25%, of at least one metal selected from elements from groups VB and VIB;

0 to 20%, preferably 0.1% to 15%, more preferably 0.1% to 10%, of at least one element selected from the group formed by boron, silicon and phosphorous;

0 to 20%, preferably 0.1% to 15%, more preferably 0.1% to 10%, of at least one element selected from group VIIA, preferably chlorine or fluorine.

The supported mixed sulphide catalyst (multimetallic sulphide catalyst) of the present invention generally comprises at least one metal selected from the following groups and in the following amounts, in % by weight with respect to the total catalyst mass:

0.01% to 40%, preferably 0.01% to 35%, more preferably 0.01% to 30%, of at least one metal selected from elements from groups IIIB and IVB, including the lanthanides and actinides (element A);

0.01% to 30%, preferably 0.01% to 25%, of at least one metal selected from groups VIIB and VIII (element B);

0.1% to 99%, preferably 1% to 98%, of at least one support selected from the group formed by amorphous matrices and low crystallinity matrices;

0.001% to 30%, preferably 0.01% to 55%, of sulphur;

the catalyst optionally containing:

0 to 90%, preferably 0.1% to 85%, more preferably 0.1% to 80%, of a zeolite;

0 to 30%, preferably 0.01% to 25%, of at least one metal selected from elements from groups VB and VIB;

0 to 20%, preferably 0.1% to 15%, more preferably 0.1% to 10%, of at least one element selected from the group formed by boron, silicon and phosphorous;

0 to 20%, preferably 0.1% to 15%, more preferably 0.1% to 10%, of at least one element selected from group VIIA, preferably chlorine or fluorine.

The invention also relates to a process for preparing a multimetallic sulphide catalyst, characterized in that at least one compound of sulphur and of carbon containing no hydrogen is used for sulphurisation.

A process for preparing a multimetallic sulphide catalyst of the present invention comprises the following steps:

a) forming a reaction mixture which comprises: a powder or mixture of powders containing at least one element selected from group IIIB, including the lanthanides and actinides, and group IVB, at least one element selected from elements from group VIIB and group VIII, at least one compound of sulphur and of carbon containing no hydrogen, such as carbon disulphide, carbon monosulphide or carbon oxysulphide, preferably carbon disulphide $CS_2$, optionally at least one solid source of carbon, and optionally at least one solid source of sulphur;

b) maintaining the reaction mixture obtained after step a) at a heating temperature of more than 40° C. at a pressure of over 0.01 MPa in a reactor.

The reactor may be a closed reactor. In this case, the pressure exerted is the autogenous pressure of the gases produced in carrying out the treatment or it can be the pressure of an inert gas. The reactor can be a traversed bed reactor. In this case, the pressure exerted is that of an inert gas. Preferably, a sealed reactor is used.

The mixture can optionally contain elemental sulphur in its different forms, for example flowers of sulphur or sulphur suspended in an aqueous medium or an organic medium. Sulphur compounds can also be used, such as hydrogen sulphide, sulphur-containing hydrocarbons such as dimethyl sulphide, dimethyl disulphide, mercaptans, thiophene compounds, thiols, polysulphides such as ditertiononylpolysulphide or TPS-37 from ATOCHEM, sulphur-rich petroleum cuts such as gasoline, kerosene, gas oil; however, the presence of a compound containing hydrogen does not in general enable the mixture to be properly sulphurised.

The mixture can optionally contain a carbon source. All of the forms of the carbon source which are known to the skilled person can be used, for example graphite, oil coke, coal coke, amorphous carbon, carbon black, charcoals obtained by partial combustion or by decomposition or by dehydrogenation of vegetable compounds or animal compounds or hydrocarbons. The carbon source generally contains hydrogen and one of its characteristics is its H/C atomic ratio. Preferably, a carbon source with an H/C ratio of less than 2, more preferably an H/C ratio of less than 1.7, and still more preferably an H/C ratio of less than 1.4 is used.

The reaction is carried out under autogenous pressure or under an inert gas. The autogenous pressure is produced by the generation of reaction products such as CO, $CO_2$, $H_2O$, COS and S. The inert gas can comprise at least one of the following compounds: nitrogen, a rare gas such as helium, neon, argon, krypton, xenon or radon, superheated steam or a combination of at least two of these compounds.

The first step of the sulphurisation process of the invention for preparing a multimetallic sulphide catalyst consists of producing a mixture of carbon disulphide and a powder containing one or more compounds comprising at least one element selected from group IIIB, including the lanthanides and actinides, group IVB and at least one element selected from elements from group VIIB, group VIII, optionally solid sulphur, optionally solid carbon, optionally a porous matrix, optionally at least one element from group VB and group VIB, optionally at least one element selected from P, B and Si, and optionally at least one source of group VIIA anions. This first step can be accomplished in several stages.

The second step of the sulphurisation process of the invention for preparing a multimetallic sulphide catalyst consists of reacting the mixture formed in the first step to obtain the sulphurised multimetallic compound. A first method for carrying out the reaction consists of heating the mixture of powders to a temperature in the range 40° C. to 1000° C., preferably in the range 60° C. to 700° C., under autogenous pressure. Preferably, a steel autoclave which is resistant to corrosion by sulphur compounds is used. The duration of heating the reaction mixture required for sulphurisation depends on the composition of the reaction mixture and on the reaction temperature.

Also stated above and according to a second preferred embodiment of the invention, another preferred catalyst of the invention contains at least one porous amorphous or low crystallinity type matrix and at least one sulphide of at least one element A selected from the group consisting of elements from group IIIB, including the lanthanides and actinides, group IVB and group VB, the quantity of sulphur fixed on the catalyst being over 40% of the quantity of sulphur corresponding to the stoichiometric quantity of sulphur in the sulphides of elements IIIB, IVB and VB. This preferred catalyst may further comprise at least one metal from group VIII, at least one group VIIA element, at least one zeolite and at least one element selected from the group formed by P, B, Si.

Thus, more particularly, the invention relates to sulphide catalysts comprising at least one group VB metal and at least one group VIII metal, doped with boron and/organic silicon and/or phosphorous.

More particularly again, the invention relates to sulphide catalysts comprising at least one group IIIB metal, including the lanthanides and actinides, and at least one group VIII metal, doped with boron and/or silicon and/or phosphorus.

The group VB elements are selected from vanadium, niobium and thallium; the group IVB elements are selected from titanium, zirconium and hafnium, preferably titanium. The group IIIB elements are selected from yttrium, lanthanum, cerium, praseodymium, neodymium, samarium, europium, gadolinium, terbium, dysprosium, holmium, erbium, thulium, ytterbium, lutetium, actinium, thorium and uranium. The group VIII elements are selected from iron, cobalt, nickel, ruthenium, rhodium, palladium, osmium, iridium and platinum, preferably iron, cobalt and nickel.

The quantity of sulphur in the catalyst of the invention is such that the degree of sulphurisation is over 40%, preferably over 50% and more preferably over 60%.

This type of catalyst of the present invention generally comprises at least one metal selected from the following groups and in the following amounts, in % by weight with respect to the total catalyst mass:

0.01% to 40%, preferably 0.01% to 35%, more preferably 0.01% to 30%, of at least one metal selected from elements from groups IIIB, IVB and VB (element A);

0.1% to 99%, preferably 1% to 98%, of at least one support selected from the group formed by amorphous matrices and low crystallinity matrices;

0.001% to 30%, preferably 0.01% to 55%, of sulphur;

0 to 30%, preferably 0.01% to 25%, of at least one group VIII metal; and optionally 0 to 90%, preferably 0.1% to 85%, more preferably 0.1% to 80%, of a zeolitic or non zeolitic molecular sieve;

0 to 40%, preferably 0.1% to 30%, more preferably 0.1% to 20%, of at least one element selected from the group formed by boron, silicon and phosphorus;

0 to 20%, preferably 0.1% to 15%, more preferably 0.1% to 10%, of at least one element selected from group VIIA.

The invention also relates to a process for preparing sulphurised catalysts according to the second preferred embodiment, characterized in that the catalyst is sulphurised by a mixture containing at least one source of elemental sulphur and at least one source of carbon in an autogenous and/or inert atmosphere.

More precisely, a process for producing the sulphide catalysts of the present invention comprises the following steps:

a) forming a reaction mixture which comprises: a powder or mixture of powders containing at least one element selected from group IIIB, including the lanthanides and actinides, group IVB and group VB, at least one porous matrix which is generally an amorphous or low crystallinity oxide type matrix, optionally associated with a zeolitic or non zeolitic molecular sieve, optionally at least one group VIII element, optionally at least one source of an element selected from the group formed by P, B and Si, optionally at least one source of anions from group VIIA, at least one source of elemental sulphur and at least one source of carbon, and optionally water;

b) maintaining the reaction mixture obtained after step a) at a heating temperature of more than 40° C. at a pressure of over 0.01 MPa in a reactor.

The reactor may be a closed reactor. In this case, it may be charged in the open air and after sealing and reacting, the pressure exerted is the autogenous pressure of the gases produced in the reduction and sulphurisation reactions. The reactor can also be charged in an atmosphere of an inert gas.

The reactor can optionally be a traversed bed reactor, such as a fixed bed, moving bed, ebullated bed, or fluidised bed reactor. In this case the pressure exerted is that of an inert gas.

Preferably, a closed reactor is used.

The sulphur source is elemental sulphur in its different forms, for example flowers of sulphur, sulphur suspended in an aqueous medium or sulphur suspended in an organic medium.

All of the forms of the carbon source which are known to the skilled person can be used, for example graphite, oil coke, coal coke, amorphous carbon, carbon black, charcoals obtained by partial combustion or by decomposition or by dehydrogenation of vegetable compounds or animal compounds or hydrocarbons. The carbon source generally contains hydrogen and one of its characteristics is its H/C atomic ratio. Preferably, a carbon source with an H/C ratio of less than 2, more preferably an H/C ratio of less than 1.7, and still more preferably an H/C ratio of less than 1.4 is used.

The reaction is carried out under autogenous pressure or under an inert gas. The autogenous pressure is produced by the generation of reaction products such as CO, $CO_2$, $H_2O$. The inert gas can comprise at least one of the following compounds: nitrogen, a rare gas such as helium, neon, argon, krypton, xenon or radon, superheated steam or a combination of at least two of these compounds.

The first step of the sulphurisation process for preparing a supported sulphide catalyst according to the second preferred embodiment of the invention consists of producing a mixture of the source of elemental sulphur and the carbon source and a powder containing the compound or compounds comprising at least one element selected from group IIIB, including the lanthanides and actinides, group IVB and group VB, the porous matrix and optionally at least one group VIII element, optionally at least one element selected from P, B and Si, and optionally at least one anion from group VIIA. This first step can be accomplished in several stages.

The second step of the sulphurisation process for preparing a supported sulphide catalyst according to the second preferred embodiment of the invention consists of reacting the mixture formed in the first step to obtain the sulphurised compound. A first method for carrying out the reaction consists of heating the mixture of powders to a temperature in the range 40° C. to 1000° C., preferably in the range 60° C. to 700° C., under autogenous pressure. Preferably, a steel autoclave which is resistant to corrosion by the sulphur compounds is used. The duration of heating the reaction mixture required for sulphurisation depends on the composition of the reaction mixture and on the reaction temperature.

Whatever the implemented sulphurization process is and whatever the embodiment of the invention is, compounds containing at least one element selected from group IIIB, including the lanthanides and actinides, group IVB, group VIIB, group VIII, optionally group VB and group VIB, include oxides, hydroxides, oxyhydroxides, acids, polyoxometallates, alkoxides, oxalates, ammonium salts, nitrates, carbonates, hydroxycarbonates, carboxylates, halides, oxyhalides, phosphates, carbamates, thiocarbamates, xanthates, thioxanthates, acetylacetonates, thiometallaates and thiosalts, in particular of ammonium. Preferably, oxides and salts of transition metals, lanthanides and actinides are used.

In each sulphurization process, the preferred phosphorous source is orthophosphoric acid $H_3PO_4$, but its salts and esters such as alkaline phosphates and ammonium phosphates are also suitable. Phosphorus can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used: a hydrogel, an aerogel or a colloidal suspension of an oxide of silicon, precipitation oxides, oxides from the hydrolysis of esters such as ethyl orthosilicate $Si(OEt)_4$, silanes and polysilanes, siloxanes and polysiloxanes. Silicon can be added, for example, by impregnating with ethyl silicate in solution in an alcohol.

The boron source can be a boron salt such as ammonium biborate or pentaborate, or aluminium borate. Boron can, for example, be introduced in the form of a solution of boric acid in an alcohol.

Sources of group VIIA elements which can be used are well known to the skilled person. As an example, fluoride ions can be introduced in the form of hydrofluoric acid or its salts. These salts are formed with alkaline metals, ammonium salts or salts of an organic compound. In the latter case, the salt is advantageously formed in the reaction mixture by reaction between the organic compound and hydrofluoric acid. Hydrolysable compounds which can liberate fluoride ions in water can also be used, such as ammonium fluorosilicate $(NH_4)_2SiF_6$, silicon tetrafluoride $SiF_4$ or sodium fluorosilicate $Na_2SiF_6$. Fluorine can be introduced, for example by impregnating with an aqueous solution of hydrofluoric acid or ammonium fluoride.

The chloride anions can be introduced in the form of hydrochloric acid or its salts. These salts are formed with alkali metals, ammonium or an organic compound. In the latter case, the salt is advantageously formed in the reaction mixture by reaction between the organic compound and hydrochloric acid.

The normally amorphous or low crystallinity porous mineral matrix is generally selected from the group formed by alumina, silica and silica-alumina, or a mixture of at least two of the oxides cited above. Aluminates containing at least two of the metals cited above can also be selected. Preferably, matrices containing alumina are used, in all of its forms which are known to the skilled person, for example gamma alumina.

Mixtures of alumina and silica and mixtures of alumina and boron oxide can also advantageously be used.

In addition to at least one of the compounds cited above, the matrix can also comprise at least one compound selected from the group formed by molecular sieves of the crystalline aluminosilicate type or natural or synthetic zeolites such as Y zeolite, X zeolite, L zeolite, beta zeolite, small pore mordenite, large pore mordenite, omega zeolites, NU-10, TON, ZSM-22, and ZSM-5 zeolite.

The matrix can first be formed and calcined before introduction into the mixture. Forming can be by extrusion, pelletisation, the oil-drop method, rotating plate granulation or any other method which is known to the skilled person. The pre-formed matrix is optionally calcined in air, usually at a temperature of at least 100° C., routinely at about 200° C. to 1000° C.

Each element which may be comprised in the catalyst of the invention and more particularly element from group IIIB, including the lanthanides and actinides, group IVB, group VB, group VIB, group VIIB, group VIII, as well as element selected from the group formed by P, B and Si, and the element selected from group VIIA anions, can be introduced by one or more ion exchange operations carried out on the selected matrix, using a solution containing at least one precursor of a transition metal or rare earth metal.

The matrix can be pre-impregnated with the transition metal salt or rare earth salt, or a salt containing the element selected from P, B and Si or an anion from group VIIA. As an example, impregnation of molybdenum be facilitated by adding phosphoric acid to the solutions, which also enables phosphorous to be introduced to improve the catalytic activity. Other phosphorous compounds can be used, as is well known to the skilled person.

The matrix is preferably impregnated using the "dry" impregnating method which is well known to the skilled person.

Impregnation can be carried out in a single step using a solution containing all of the constituent elements of the final catalyst.

When the metal or metals is/are introduced in a plurality of steps for impregnating the corresponding precursor salts, an intermediate step for drying the catalyst must be carried out at a temperature in the range 60° C. to 250° C.

The mixture of powders containing all or part of the ingredients can be formed, for example by extrusion, pelletisation, the oil drop method, rotating plate granulation or any other method which is well known to the skilled person.

The sulphide catalysts (simple sulphides and multimetallic sulphides) obtained in the present invention are used as catalysts for hydrogenation, hydrodenitrogenation, hydrodeoxygenation, hydrodearomatization, hydrodesulphurization, hydrodemetallization, hydroisomerization and hydrocracking of hydrocarbon-containing feeds containing aromatic and/or olefinic and/or naphthenic and/or paraffinic compounds, said feeds optionally containing metals and/or nitrogen and/or oxygen and/or sulphur. In these applications, the catalysts obtained by the present invention have an improved activity over the prior art.

The feeds used in the hydrotreatment process are gasolines, kerosenes, gas oils, vacuum gas oils, deasphalted or non deasphalted residues, paraffin oils, waxes and paraffins. They may contain heteroatoms such as sulphur, oxygen and nitrogen, and metals. The reaction temperature is in general over 200° C. and usually in the range 280° C. to 480° C. The pressure is over 0.1 MPa and in general over 5 MPa. The hydrogen recycle ratio is a minimum of 80, usually in the range 200 to 4000 liters of hydrogen per liter of feed. The hourly space velocity is generally in the range 0.1 to 20 $h^{-1}$.

The refiner is interested in the hydrodesulphurization activity (HDS), hydrodenitrogenation activity (HDN) activity and the conversion. Fixed objectives have to be achieved under conditions which are compatible with economic reality. Thus the refiner seeks to reduce the temperature, the pressure, and the hydrogen recycle ratio and to maximise the hourly space velocity. The activity is known to be increased by increasing the temperature, but this is often to the detriment of catalyst stability. The stability or service life increases with increased pressure or hydrogen recycle ratio, but this is to the detriment of the economics of the process.

The following examples illustrate the invention without in any way limiting its scope.

EXAMPLE 1

Preparation of an Alumina Support used in Composition of Supported Catalysts

An alumina based support was produced to enable the catalysts described below to be prepared from the formed support. To this end, a matrix composed of ultrafine tabular boehmite or alumina gel sold by Condéa Chemie GmbH under the trade name SB3 was used. This gel was mixed with an aqueous solution containing 66% nitric acid (7% by weight of acid per gram of dry gel), then mixed for 15 minutes. After mixing, the paste obtained was passed through a die with cylindrical orifices with a diameter of 1.3 mm. The extrudates were then dried overnight at 120° C. and calcined at 550° C. for 2 hours in moist air containing 7.5% by volume of water. Cylindrical extrudates 1.2 mm in diameter were obtained which had a specific surface area of 243 $m^2/g$, a pore volume of 0.61 $cm^3/g$ and a monomodal pore distribution centred on 10 nm. X ray diffraction analysis of the matrix revealed that it was uniquely composed of low crystallinity cubic gamma alumina.

EXAMPLE 2

Preparation of a Ce Catalyst Supported on Alumina

Cerium was added to the extruded alumina support of Example 1 by dry impregnation using a solution of cerium nitrate $Ce(NO_3)_4.xH_2O$. After dry impregnation, the extrudates were dried overnight at 80° C. and calcined at 350° C. for 2 hours in dry air. The Ce/alumina catalyst obtained had a final $CeO_2$ content of 5.1% by weight.

EXAMPLE 3

Preparation of a CoCe Catalyst Supported on Alumina

The Ce/alumina catalyst of Example 2 was dry impregnated using an aqueous cobalt nitrate $Co(NO_3)_2.6H_2O$ solution. After ageing at room temperature in a water-saturated atmosphere, the impregnated extrudates were dried overnight at 80° C. then calcined at 350° C. for 2 hours in dry air. The final cerium oxide content was 5.0% by weight. The final cobalt oxide CoO content was 2.0% by weight.

EXAMPLE 4

Catalyst Sulphurisation Using Carbon Disulphide 50 g of freshly calcined catalyst was introduced into an autoclave and a quantity of carbon disulphide $CS_2$ was introduced such that the quantity of sulphur introduced corresponded to 120% of the theoretical stoichiometry of the reaction based on the formation of CoS and $Ce_2S_4$ from CoO and $CeO_2$ respectively. The autoclave was then sealed and heated to 400° C. for 10 hours. After cooling, the autoclave was depressurised by pumping out the gases it contained, the autoclave was re-sealed and transferred to a glove box in an inert atmosphere to protect the product of the oxidation reaction from oxygen in the air. After opening, the black extrudates were recovered and preserved under inert gas in a sealed ampoule. This sulphurisation was termed S1.

EXAMPLE 5

Catalyst Sulphurisation Using Hydrogen Sulphide 50 g of freshly calcined catalyst was introduced into a reactor with a fixed bed of catalyst flushed with a stream of gas containing 15% by volume of $H_2S$ in hydrogen at atmospheric pressure. 2 liters per hour of the gaseous mixture was passed per 5 g of solid and the catalyst was heated to a temperature of 400° C. for 10 hours. This sulphurisation, S2, is routinely used in the laboratory and is occasionally still used industrially.

EXAMPLE 6

Catalyst Sulphurisation Using Carbon Disulphide Diluted in Toluene 50 g of freshly calcined catalyst was impregnated with a quantity of $CS_2$ diluted in toluene such that the quantity of sulphur deposited corresponded to 120% of the theoretical stoichiometry of the reaction based on the formation of CoS and $Ce_2S_4$ from CoO and $CeO_2$ respectively. The impregnated catalyst was then activated in a fixed bed reactor flushed with a stream of nitrogen at atmospheric pressure. 1 liter per hour of nitrogen was passed per 5 g of solid, the temperature was raised at a rate of 3° C. per minute and the catalyst was heated at a temperature of 400° C. for 2 hours. This sulphurisation was termed S3.

EXAMPLE 7

Sulphur Contents in Ce/Alumina Based Catalysts after Sulphurisation

The quantities of fixed sulphur and the quantities of residual carbon on the sulphurised catalysts of Examples 2 and 3 sulphurised as described in Examples 4, 5 and 6 are shown in Table 1. This table shows that sulphurisation method S1 could produce a highly satisfactory degree of sulphurisation for the metals, in particular that of group IIIB, including the lanthanides and actinides, when these were supported on alumina. Method S2 was not effective in sulphurising these catalysts. Method S3 sulphurised some of the metals in the catalysts, but remained inferior to method S1.

TABLE 1

| Catalyst | Sulphurisation method | Quantity of $CS_2$ per 50 g of catalyst | S content after sulphurisation (wt %) | C content after sulphurisation (wt %) | Degree of sulphurisation (%) |
| --- | --- | --- | --- | --- | --- |
| Ce/alumina (comparative) | S1 | 1.35 g | 1.67 | 0.1 | 88 |
| CoCe/alumina | S1 | 1.93 g | 2.28 | 0.15 | 84 |
| Ce/alumina (comparative) | S2 | — | 0.2 | <0.05 | 10 |
| CoCe/alumina | S2 | — | 0.7 | <0.05 | 26 |
| Ce/alumina (comparative) | S3 | 1.35 g | 1.32 | 1.7 | 70 |
| CoCe/alumina | S3 | 1.93 g | 2.04 | 2.3 | 75 |

EXAMPLE 8

Preparation of Titanium Catalyst Supported on Alumina

We produced large quantities of a support based on alumina and titanium so as to enable catalysts to be prepared from the same formed support. To this end, we used an alumina gel sold by Condéa Chemie GmbH under the trade name SB3 and a commercially available titanium oxide powder from Thann and Mulhouse. The mixture of alumina gel and titanium powder was mixed with water and nitric acid then mixed for 15 minutes. After mixing, the paste obtained was passed through a cylindrical die to produce extrudates with a diameter of 1.4 mm. The extrudates were then dried overnight at 120° C. and calcined at 550° C. for 2 hours in moist air containing 7.5% by volume of water. Cylindrical extrudates 1.2 mm in diameter were obtained which had a composition of 8% by weight of $TiO_2$ and 92% by weight of $Al_2O_3$.

EXAMPLE 9

Preparation of a Titanium and Nickel Catalyst Supported on Alumina

Nickel was added to the Ti/alumina extrudates of Example 8 by dry impregnation in an aqueous medium using a solution of nickel nitrate $Ni(NO_3)_2.6H_2O$. After dry impregnation of the nickel nitrate, the extrudates were dried overnight at 120° C. and calcined at 550° C. for 2 hours in moist air containing 7.5% by volume of water. The final NiTi catalyst obtained contained 2.50% by weight of nickel oxide and 7.8% of titanium oxide.

EXAMPLE 10

Sulphurisation of a Titanium Catalyst Supported on Alumina

Sulphurisation methods S1, S2 and S3 were then applied to the Ti/alumina catalyst. For method S1, a mass of 100 g of catalyst was used which was mixed with 11.5 g of carbon disulphide (1.5 times the stoichiometry calculated on the basis of $TiS_2$). For method S3 of Example 3, 9.2 ml of carbon sulphide in toluene was used.

EXAMPLE 11

Sulphurisation of Titanium-Nickel Catalysts Supported on Alumina

In the same manner, sulphurisation methods S1, S2 and S3 were applied to the NiTi/alumina catalyst. For method S1, 100 g of catalyst was used which was mixed with 13.0 g of carbon disulphide (1.5 times the stoichiometry calculated on the basis of $NiS+TiS_2$). For method S3 of Example 3, 10.4 ml of carbon sulphide in toluene was used.

EXAMPLE 12

Sulphur Contents for Titanium/Alumina Based Catalysts After Sulphurisation

The sulphur contents for the sulphurised titanium/alumina catalysts in Examples 10 and 11 are shown in Table 2. The low value obtained for the degree of sulphurisation of titanium obtained by method S2 corresponding to a conventional method used to sulphurise many catalysts indicates that this method could not be used to prepare multimetallic sulphide phases containing, in particular, titanium sulphide. In contrast, methods S1 and S2 produced substantial sulphurisation of the metals Ni and Ti supported on alumina.

TABLE 2

| Catalyst | Sulphurisation method | S content after sulphurisation (wt %) | C content after sulphurisation (wt %) | Degree of sulphurisation (%) |
|---|---|---|---|---|
| Ti/alumina (comparative) | S1 | 5.23 | 0.9 | 82 |
| NiTi/alumina | S1 | 6.47 | 1.25 | 88 |
| Ti/alumina (comparative) | S2 | 0.64 | <0.05 | 10 |
| NiTi/alumina | S2 | 1.21 | <0.05 | 17 |
| Ti/alumina (comparative) | S3 | 4.27 | 1.9 | 67 |
| NiTi/alumina | S3 | 5.61 | 2.4 | 77 |

EXAMPLE 13

Preparation of Titanium-Nickel Catalysts Supported on Alumina Containing B, Si, F The NiTi/alumina catalyst prepared in Example 9 was impregnated with an aqueous solution comprising a Rhodorsil EP1 (Rhone-Poulenc) silicone emulsion so as to deposit 2% by weight of $SiO_2$. After ageing at room temperature in a water-saturated atmosphere, the impregnated extrudates were then dried overnight at 120° C. and calcined at 550° C. for 2 hours in dry air. A NiTiSi/alumina catalyst was obtained.

We also impregnated a sample of the NiTi/alumina catalyst prepared in Example 9 with an aqueous solution comprising ammonium biborate and Rhodorsil EP1 (Rhone-Poulenc) silicone emulsion so as to deposit 1.8% by weight of $B_2O_3$ and 2% by weight of $SiO_2$. After ageing at room temperature in a water-saturated atmosphere, the impregnated extrudates were dried overnight at 120° C. and calcined at 550° C. for 2 hours in dry air. A NiTiBSi/alumina catalyst was obtained. Fluorine was then added to this catalyst by impregnation using a dilute hydrofluoric acid solution so as to deposit 1% by weight of fluorine. After drying overnight at 120° C. and calcining at 550° C. for 2 hours in dry air, catalyst NiTiBSiF/alumina was obtained. The characteristics of these catalysts are shown in Table 3.

TABLE 3

Characteristics of doped NiTi/alumina catalysts

| Catalyst | NiTi | NiTiSi | NiTiBSi | NiTiBSiF |
|---|---|---|---|---|
| $TiO_2$ (wt %) | 7.8 | 7.6 | 7.5 | 7.4 |
| NiO (wt %) | 2.5 | 2.45 | 2.4 | 2.4 |
| $B_2O_3$ (wt %) | 0 | 0 | 1.8 | 1.8 |
| $SiO_2$ (wt %) | 0 | 1.9 | 1.9 | 1.9 |
| F (wt %) | 0 | 0 | 0 | 0.97 |
| $Al_2O_3$ (wt %) | 89.7 | 88.0 | 86.5 | 85.7 |

EXAMPLE 14

Preparation of Titanium and Rhenium Catalysts Supported on Alumina

Rhenium was added to the Ti/alumina extrudates prepared in Example 8 by dry impregnation using a solution of ammonium perrhenate $NH_4ReO_4$. After impregnation, the extrudates were dried overnight at 120° C. and calcined at 550° C. for 2 hours in moist air containing 7.5% by volume of water. The final ReTi catalyst obtained contained 0.50% by weight of rhenium oxide and 8.0% of titanium oxide.

Rhenium and nickel were added to the Ti/alumina extrudates prepared in Example 8 by dry impregnation in an aqueous medium using a mixture of nickel nitrate $Ni(NO_3)_2.6H_2O$ and ammonium perrhenate $NH_4ReO_4$. After dry impregnation, the extrudates were dried overnight at 120° C. and calcined at 550° C. for 2 hours in moist air containing 7.5% by volume of water. The final ReNiTi catalyst obtained contained 2.30% of nickel oxide, 0.47% by weight of rhenium oxide and 7.75% of titanium oxide.

EXAMPLE 15

Preparation of Titanium and Chromium Catalysts Supported on Alumina

Chromium was added to the Ti/alumina extrudates prepared in Example 8 by dry impregnation using a solution of ammonium chromate. After dry impregnation, the extrudates were dried overnight at 120° C. and calcined at 550° C. for 2 hours in moist air containing 7.5% by volume of water. The final CrTi catalyst obtained contained 1.50% by weight of chromium oxide and 7.9% of titanium oxide.

Chromium and nickel were added to the Ti/alumina extrudates prepared in Example 8 by dry impregnation using a mixture of ammonium chromate and nickel nitrate $Ni(NO_3)_2.6H_2O$. After dry impregnation, the extrudates were dried overnight at 120° C. and calcined at 550° C. for 2 hours in moist air containing 7.5% by volume of water. The final CrNiTi catalyst obtained contained 1.40% of chromium oxide, 2.2% by weight of nickel oxide and 7.6% of titanium oxide.

EXAMPLE 16

Preparation of Titanium and Niobium Catalysts Supported on Alumina

Niobium was added to the Ti/alumina extrudates prepared in Example 8 to obtain a NbTi/alumina catalyst. The extrudates of the Ti/alumina catalyst prepared in Example 8 above were impregnated with an aqueous solution of niobium oxalate $Nb(HC_2O_4)_5$, oxalic acid and ammonium oxalate. The aqueous solution containing niobium was prepared from 1330 ml of water in which 33 g of oxalic acid, 37.2 g of ammonium oxalate and 92.3 g of niobium oxalate had been dissolved. To prepare the solution, the mixture of oxalic acid and ammonium oxalate was dissolved and when the solution had become clear that solution was heated to 55° C. and niobium oxalate was added. It was then made up with water to obtain 1330 ml of solution. The Ti/alumina support was then impregnated using the excess solution method. The 1330 ml of solution was brought into contact with 380 g of catalyst. This deposited about 5% by weight of Nb on the catalyst. After two hours, the extrudates were recovered. These were dried overnight at 120° C. in a stream of dry air. Catalyst NbTi/alumina was obtained with a final content of 4.80% by weight of niobium oxide and 7.6% of titanium oxide.

The NbTi/alumina catalyst obtained above was dry impregnated with an aqueous nickel nitrate solution, dried overnight at 120° C. in air and finally calcined n air at 550° C. The weight contents of the NbNiTi catalysts obtained were 2.45% by weight of nickel oxide, 4.7% by weight of niobium oxide and 7.4% by weight of titanium oxide.

EXAMPLE 17

Sulphurisation of Titanium Catalysts Supported on Alumina

Sulphurisation method S1 was then applied to the catalysts of Examples 13, 14, 15 and 16. 100 g of catalyst was used which was mixed with a quantity of carbon disulphide shown in Table 4. This quantity corresponded to 1.5 times the stoichiometry calculated on the basis of $TiS_2$, $NiS$, $ReS_2$, $Cr_2S_4$ or $NbS_2$ depending on the catalyst.

The sulphur contents in the titanium/alumina catalysts sulphurised using method S1 were fairly high. Method S1 thus can substantially sulphurise the metals Ni, Re, Cr, Nb and Ti supported on alumina.

TABLE 4

| Catalyst | Quantity of $CS_2$ per 100 g | S content after sulphurisation (wt %) | C content after sulphurisation (wt %) | Degree of sulphurisation (%) |
|---|---|---|---|---|
| Ti/alumina (comparative) | 11.5 | 5.23 | 0.9 | 82 |
| NiTi/alumina | 13.0 | 6.47 | 1.25 | 88 |
| NiTiSi/alumina | 13.0 | 6.65 | 1.34 | 91 |
| NiTiBSi/alumina | 13.0 | 6.57 | 1.56 | 90 |
| NiTIBSiF/alumina | 13.0 | 6.77 | 1.67 | 93 |
| ReTi/alumina | 11.9 | 5.98 | 1.1 | 91 |
| ReNiTi/alumina | 13.3 | 6.73 | 1.33 | 92 |
| CrTi/alumina | 12.4 | 5.68 | 1.6 | 82 |
| CrNiTi/alumina | 13.6 | 6.59 | 1.45 | 87 |
| NbTi/alumina | 13.9 | 6.13 | 1.78 | 85 |
| NbNiTi/alumina | 15.5 | 7.21 | 1.34 | 89 |

EXAMPLE 18

Preparation of a Bulk Titanium Sulphide Catalyst (not in Accordance with the Invention)

A mixture of 10 g of titanium oxide $TiO_2$ (G1 titanium oxide powder from Thann and Mulhouse) and 17.2 g of carbon disulphide $CS_2$ was made and poured into an autoclave. The quantity of sulphur introduced was thus 180% of the stoichiometry of the theoretical titanium sulphide composition $TiS_2$.

EXAMPLE 19

Sulphurisation of Titanium Sulphide Catalyst

After sulphurisation S1 of the catalyst of Example 18 above, a solid was obtained with the elemental composition $TiS_{1.5}$. X ray diffraction analysis showed this solid to be essentially amorphous and to contain residual $TiO_2$.

The sulphurisation method S2 of Example 2 was applied to sulphurise the titanium oxide and a solid with elemental composition $TiSo_{0.3}$ was obtained. The very small amount of sulphur in the solid obtained suggested that most of the titanium had not been sulphurised. X ray diffraction analysis indicated that this solid contained titanium oxide $TiO_2$.

The sulphurisation method S3 of Example 3 was carried out using 10 g of titanium oxide powder which was impregnated with 17.2 g of carbon disulphide $CS_2$ which was then activated in a fixed bed reactor. After sulphurisation, a solid with elemental composition $TiS_{1.3}$ was obtained. X ray diffraction analysis indicated that this solid still contained titanium oxide $TiO_2$.

EXAMPLE 20

Preparation of a Bulk Titanium and Cobalt Sulphide (in Accordance with the Invention)

A mixture of 10 g of titanium oxide $TiO_2$ (Gi titanium oxide powder from Thann and Mulhouse) and 14.5 g of cobalt nitrate $Co(NO_3)_2.6H_2O$ was produced and intimately mixed in a grinder. The mixture was then sulphurised using methods S1, S2 and S3. The results are shown in the following Example.

EXAMPLE 21

Sulphurisation of Mixed Titanium and Cobalt Catalyst

Sulphurisation method S1 of Example 1 was carried out on the mixture of titanium oxide and cobalt nitrate, wherein 24.5 g of powder and 20.5 g of carbon disulphide $CS_2$ had been added to the autoclave. The quantity of sulphur introduced was thus 180% of the stoichiometry of the mixed sulphide with a theoretical composition $Co_{0.28}Ti_{0.72}S_2$.

After sulphurisation S1, a solid with elemental composition $Co_{0.28}T_{0.72}S_{1.7}$ was obtained. X ray diffraction analysis showed this solid to be amorphous.

Sulphurisation method S2 of Example 2 was carried out on the same mixture of powder containing titanium and cobalt and a solid with elemental composition $Co_{0.28}T_{0.72}S_{0.4}$ was obtained. The very low sulphur content in the solid obtained suggests that most of the titanium had not been sulphurised. X ray diffraction analysis indicated that this solid contained cobalt sulphide $Co_9S_8$ and titanium oxide $TiO_2$.

The sulphurisation method of Example 3 was carried out on 24.5 g of powder containing titanium and cobalt to which 20.5 g of carbon disulphide $CS_2$ had been added so as to obtain a mixed sulphide with the theoretical composition $CoO_{0.28}T_{0.72}S_2$. After sulphurisation, a solid with elemental composition $Co_{0.28}Ti_{0.72}S_{1.4}$ was obtained. X ray diffraction analysis indicated that this solid contained cobalt sulphide $Co_9S_8$ and traces of titanium oxide $TiO_2$.

The sulphur content of the sulphurised CoTi solid obtained by method S3 was lower than that obtained using sulphurisation method S1 but vastly superior to that obtained using method S2. These three tests show that sulphurisation of a powder containing titanium and cobalt by a gaseous mixture of hydrogen and hydrogen sulphide, which is well known to the skilled person, cannot properly sulphurise the mixture and produce a multimetallic sulphide. Using a sulphide of carbon enables a mixed sulphide to be produced.

EXAMPLE 22

Catalyst Gas Oil HDS Test

The bulk catalysts of Examples 18 to 21, sulphurised using the three methods S1, S2 and S3, were compared in a gas oil hydrodesulphurisation test. The principal characteristics of the gas oil are shown in the following table:

| | |
|---|---|
| Density at 15° C. | 0.856 |
| Refractive index at 20° C. | 1.4564 |
| Viscosity at 50° C. | 3.72 St |
| Sulphur | 1.57% by weight |
| Simulated distillation | |
| IP | 153° C. |
| 5% | 222° C. |
| 50% | 315° C. |
| 95% | 415° C. |
| EP | 448° C. |

For the bulk catalysts of Examples 18 to 21, the gas oil HDS test was carried out under the following operating conditions:

| | |
|---|---|
| Total pressure | 3 MPa |
| Catalyst volume | 40 cm³ |
| Temperature | 370° C. |
| Hydrogen flow rate | 10 l/h |
| Feed flow rate | 40 cm³/h |

For these tests, the catalysts were sulphurised using methods S1, S2 and S3 separately from the gas oil test. The sulphurised catalysts were charged into the catalytic reactor then wetted by the feed at a temperature of 150° C. The temperature of the unit was then raised to the reaction temperature of 370° C.

A reference test was carried out for each catalyst by charging the catalyst into the catalytic test unit and carrying out a sulphurisation step by passing the test feed defined above, to which 2% by weight of dimethyldisulphide (DMDS) had been added, under the test conditions shown above, except that the temperature was 350° C., said temperature being maintained for 10 hours. After this step, the temperature was altered to the test temperature, 370° C., and pure feed was injected. This sulphurisation method was termed S0.

The catalytic performances of the three catalysts are shown in Table 5 below. They are expressed as the activity, with an order of 1.5. The relationship connecting activity and conversion (%HDS) is as follows:

Activity=$[100/(100-HDS)]^{0.5}-1$

To compare the activities of the Ti based catalysts of Examples 18 to 21, in Table 5, the activity of the monometallic Ti catalyst sulphurised by method S0 was assumed to be equal to 1.

TABLE 5

Activity of bulk catalysts for gas oil hydrodesulphurisation
Relative catalyst activity

| Sulphurisation | Ti | CoTi |
|---|---|---|
| S0 | 1 | 1.04 |
| S1 | 4.25 | 6.12 |
| S2 | 1.21 | 1.27 |
| S3 | 3.19 | 3.76 |

Table 5 shows that there is a substantial increase in the activity of catalysts containing a bulk mixed sulphide with respect to catalysts containing a simple sulphide.

It can also be seen from Table 5 that the activity of the bulk catalysts sulphurised by carbon sulphide using method S1, was better than the catalysts sulphurised by the mixture of gas oil and DMDS (S0) or sulphurised by $H_2S$ in the gas phase (S2). The catalysts sulphurised by method S3, i.e., with carbon sulphide in toluene in a fixed traversed bed reactor, also performed better than those sulphurised by method S0 or S2. The use of sulphurisation methods S1 and S3, using carbon sulphide, thus produced a mixed sulphide with a higher activity than that of the Ti sulphide by adding a group VIII element.

EXAMPLE 23

Catalyst Gas Oil HDS Test Using Supported Catalysts

The supported catalysts of Examples 2, 3, 8, 9, 14 to 16, sulphurised using the three methods S1, S2 and S3, were compared in a gas oil hydrodesulphurisation test. The principal characteristics of the gas oil were given in Example 22 above. The supported catalysts sulphurised using the three methods S1, S2 and S3 were compared in a gas oil hydrodesulphurisation test under the following operating conditions:

| | |
|---|---|
| Total pressure | 3 MPa |
| Catalyst volume | 40 cm³ |
| Temperature | 360° C. |
| Hydrogen flow rate | 20 l/h |
| Feed flow rate | 80 cm³/h |

For these tests, the catalysts were sulphurised using methods S1, S2 and S3 separately from the gas oil test. The sulphurised catalysts were charged into the catalytic reactor then wetted by the feed at a temperature of 150° C. The temperature of the unit was then raised to the reaction temperature of 360° C.

A reference test was carried out for each catalyst by charging the catalyst into the catalytic test unit and carrying out a sulphurisation step by passing the test feed defined above, to which 2% by weight of dimethyldisulphide (DMDS) had been added, under the test conditions shown above, except that the temperature was 350° C., said temperature being maintained for 10 hours. After this step, the temperature was altered to the test temperature, 360° C., and pure feed was injected. This sulphurisation method was termed S0.

The catalytic performances of the Ce/alumina catalysts of Examples 2 and 3 are shown in Table 6 below. They were calculated in the same way as that described for Example 22.

To compare the activities of the Ce based catalysts of Examples 2 and 3, in Table 6, the activity of the monometallic Ce/alumina catalyst sulphurised by method S0 was assumed to be equal to 1.

TABLE 6

Activity of Ce/alumina catalysts for gas oil hydrodesulphurisation
Relative catalyst activity

| Sulphurisation | Ce/alumina | CoCe/alumina |
|---|---|---|
| S0 | 1 | 1.17 |
| S1 | 3.45 | 5.17 |
| S2 | 0.95 | 1.05 |
| S3 | 2.34 | 3.26 |

It can be seen from Table 6 that the activity of the alumina-supported Ce catalysts sulphurised by carbon sulphide using method S1 was better than the catalysts sulphurised by the mixture of gas oil and DMDS (S0) or sulphurised by $H_2S$ in the gas phase (S2). The catalysts sulphurised by method S3, i.e., with the carbon sulphide in toluene in a fixed traversed bed reactor, also performed better than S0 or S2. Further, it can be seen from Table 6 that when the supported catalysts were sulphurised by method S1, a very substantial improvement in activity of the supported catalysts containing a mixed sulphide was observed compared with supported catalysts containing a simple sulphide.

The catalytic performances of the Ti/alumina catalysts of Examples 8 to 12 are shown in Table 7 below.

To compare the activities of the Ti based catalysts of Examples 8 to 12, in Table 7, the activity of the monometallic Ti/alumina catalyst sulphurised by method S0 was assumed to be equal to 1.

TABLE 7

Activity of Ti/alumina catalysts for as oil hydrodesulphurisation
Relative catalyst activity

| Sulphurisation | Ti | NiTi |
|---|---|---|
| S0 | 1 | 1.06 |
| S1 | 1.45 | 2.69 |
| S2 | 0.65 | 0.87 |
| S3 | 1.24 | 1.87 |

It can be seen from Table 7 that the activity of supported catalysts sulphurised by carbon sulphide using method S1 was better than the catalysts sulphurised by the mixture of gas oil and DMDS (S0) or sulphurised by $H_2S$ in the gas phase (S2). The catalysts sulphurised by method S3, i.e., with the suspension of carbon sulphide in toluene in a fixed traversed bed reactor, also performed better than S0 or S2.

Table 7 also shows a substantial increase in the activity of supported catalysts containing a mixed sulphide compared with supported catalysts containing a simple sulphide. It is especially remarkable to observe in Tables 6 and 7 that when sulphurisation methods S1 and S3, using carbon sulphide, were used, a very substantial increase in activity was observed when an element from group VIII, Ni for the Ti/alumina catalyst or Co for the Ce/alumina catalyst. This effect is due to the formation of a mixed sulphide.

The doped Ti/alumina catalysts of Examples 13 to 17 were used to measure the hydrodesulphurisation activity under the same conditions as above. They were sulphurised using method S1 alone.

To compare the activities of the doped Ti/alumina based catalysts of Examples 13 to 17, in Table 8, the activity of the monometallic Ti/alumina catalyst sulphurised by method S1 was assumed to be equal to 1.

TABLE 8

Activity of doped Ti/alumina catalysts for gas oil hydrodesulphurisation

| Catalyst | Relative activity of catalyst |
|---|---|
| Ti/alumina (comparative) | 1 |
| NiTi/alumina | 1.85 |
| NiTiSi/alumina | 2.15 |
| NiTiBSi/alumina | 2.34 |
| NiTiBSiF/alumina | 3.54 |
| ReTi/alumina | 1.89 |
| ReNiTi/alumina | 2.77 |
| CrTi/alumina | 1.23 |
| CrNiTi/alumina | 2.13 |
| NbTi/alumina | 1.65 |
| NbNiTi/alumina | 3.21 |

Table 8 shows that the activities of the Ti and NiTi catalysts supported on alumina and sulphurised by carbon disulphide using method S1 were better still when at least one element selected from the group P, B, Si and F was added to the catalyst.

The results of Table 8 also indicate that an association of an element from group IVB (Ti) with a group VIIB element (rhenium) or a group VIB element (chromium) or a group VB element (niobium) leads to an improvement in the activity of the catalyst. Without wishing to be bound to a particular theory, this can be interpreted as the formation of a mixed phase of these elements leading to a synergistic effect on the catalytic activity for gas oil hydrodesulphurisation. Table 8 also shows a very substantial improvement in the activity of supported catalysts containing a mixed sulphide with respect to the supported catalysts containing a simple sulphide.

The formation of the supported multimetallic sulphide phases of the invention thus improves the catalytic properties.

EXAMPLE 24

Preparation of a Nb/Alumina Hydrotreatment Catalyst

Niobium was added to the extruded alumina support of Example 1 by dry impregnation of a solution of niobium pentoxide $Nb(OEt)_5$ in ethanol. After dry impregnation, the extrudates were dried overnight at 80° C. The Nb/alumina catalyst obtained had a final diniobium pentoxide content of 13.1% by weight.

EXAMPLE 25

Preparation of a CoNb/Alumina Hydrotreatment Catalyst

Cobalt was added to the Nb/alumina catalyst of Example 24 by dry impregnation using a solution of cobalt nitrate $Co(NO_3)_2.6H_2O$ so as to obtain a final cobalt oxide CoO content of 2.9% by weight.

After dry impregnation, the extrudates were dried overnight at 80° C. The CoNb/alumina catalyst obtained contained 12.7% by weight of $Nb_2O_5$ and 2.8% by weight of CoO.

EXAMPLE 26

Preparation of CoNbB/Alumina Catalysts

1% of boron was added to the CoNb/alumina catalyst by dry impregnation using ammonium biborate in solution in water. The catalyst was then dried overnight in dry air at 80° C. and calcined in air at 460° C. for two hours. Catalyst CoNbB/alumina was thus obtained, containing 12.5% of $Nb_2O_5$, 2.7% of CoO, 0.95% of B.

EXAMPLE 27

Preparation of a CoNbF/Alumina Catalyst

1% of fluorine was added to the CoNb/alumina catalyst by impregnation using ammonium fluoride $NH_3F$ in solution in water. The catalyst was then dried overnight in dry air at 80° C. and calcined in air at 500° C. for two hours. Catalyst CoNbF/alumina was thus obtained, containing 12.7% of $Nb_2O_5$, 2.8% of CoO, 0.92% of F.

EXAMPLE 28

Preparation of a CoNbP/Alumina Catalyst 1.5% of phosphorous was added to the CoNb/alumina catalyst by impregnation using phosphoric acid.

The catalyst was then dried overnight in dry air at 80° C. and calcined in air at 500° C. for two hours. Catalyst CoNbP/alumina was thus obtained, containing 12.5% of $Nb_2O_5$, 2.65% of CoO, and 1.45% of P.

EXAMPLE 29

Preparation of a CoNbSi/Alumina Catalyst 1.5% of silicon was added to the CoNb/alumina catalyst by impregnation using Rhodorsil E1P silicone oil.

The catalyst was then dried overnight in dry air at 80° C. and calcined in air at 500° C. for two hours. Catalyst CoNbSi/alumina was thus obtained, containing 12.5% of $Nb_2O_5$, 2.57% of CoO, and 1.37% of Si.

EXAMPLE 30

Preparation of a Ce/Alumina Hydrotreatment Catalyst

Cerium was added to the extruded alumina support of Example 1 by dry impregnation using a solution of cerium nitrate $Ce(NO_3)_4 \cdot xH_2O$. After dry impregnation, the extrudates were dried overnight at 80° C. and calcined at 350° C. for 2 hours in dry air. The Ce/alumina catalyst obtained had a final $CeO_2$ content of 5.1% by weight.

EXAMPLE 31

Preparation of a CoCe/Alumina Hydrotreatment Catalyst

The catalyst of Example 30 was dry impregnated using an aqueous cobalt nitrate $Co(NO_3)_2 \cdot 6H_2O$ solution. After ageing at room temperature in a water-saturated atmosphere, the impregnated extrudates were dried overnight at 80° C. then calcined at 350° C. for 2 hours in dry air. The final cerium oxide content was 14.5% by weight. The final cobalt oxide CoO content was 2.0% by weight.

EXAMPLE 32

Catalyst Sulphurisation S4 (in Accordance with the Invention)

50 g of freshly calcined catalyst was introduced into an autoclave and the quantity of powdered elemental sulphur (sublimed sulphur from AUROS, ref. 2012546) corresponding to 120% of the theoretical stoichiometry of the reaction was added along with the quantity of powdered carbon (NORIT carbon, 211, 660 $m^2/g$ from AUROS, ref. 4040250) corresponding to 110% of the theoretical stoichiometry based on the formation of CoS, $NbS_2$, and $Ce_2S_4$ from CoO, $Nb_2O_5$, and $CeO_2$ respectively depending on the type of catalyst of Examples 24 to 31.

The autoclave was then sealed and heated to 400° C. for 10 hours. After cooling, the autoclave was depressurised by pumping out the gases it contained, the autoclave was re-sealed and transferred to a glove box in an inert atmosphere to protect the product of the oxidation reaction from oxygen in the air. After opening, the black extrudates were recovered and preserved under inert gas in a sealed ampoule.

The quantities of elemental sulphur and powdered carbon used for sulphurisation S4 of 50 g of each catalyst of Examples 24 to 31 are shown in Table 9. The quantities of fixed sulphur and the quantities of residual carbon on the sulphurised catalysts are also shown in Table 9. This table shows that sulphurisation method S4 can produce a highly satisfactory degree of sulphurisation of the group VB metal, niobium, and of the lanthanide group metal, cerium, when these were supported on alumina.

The degree of sulphurisation was maintained in the presence of an element selected from the group formed by P, B, Si and F.

TABLE 9

| Catalyst | Quantity of sulphur (g/50 g cat) | Quantity of carbon (g/50 g cat) | S content after sulphurisation (wt %) | C content after sulphurisation (wt %) | Degree of sulphurisation (%) |
|---|---|---|---|---|---|
| Nb | 3.78 | 0.98 | 5.90 | 1.7 | 100 |
| CoNb | 4.39 | 1.19 | 6.65 | 1.3 | 98 |
| CoNbP | 4.39 | 1.2 | 6.52 | 1.4 | 96 |
| CoNbF | 4.39 | 1.2 | 6.70 | 1.7 | 100 |
| CoNbB | 4.39 | 1.2 | 6.47 | 1.5 | 94 |
| CoNbSi | 4.39 | 1.2 | 6.58 | 1.8 | 97 |
| Ce | 1.14 | 0.2 | 1.76 | 0.1 | 95 |
| CoCe | 1.63 | 0.37 | 2.47 | 0.3 | 94 |

EXAMPLE 33

Catalyst Sulphurisation S2 (not in Accordance with the Invention)

50 g of freshly calcined catalyst was introduced into a fixed bed catalyst flushed with a gas stream containing 15% by volume of $H_2S$ in hydrogen at atmospheric pressure. For every 50 g of solid, 2 liters per hour of gaseous mixture were passed and the catalyst was heated to a temperature of 400°

C. for 10 hours. This sulphurisation, S2, is routinely used in the laboratory and still sometimes used industrially.

TABLE 11

| Catalyst | Quantity of sulphur (g/50 g cat) | Quantity of carbon (g/50 g cat) | S content after sulphurisation (wt %) | C content after sulphurisation (wt %) | Degree of sulphurisation (%) |
|---|---|---|---|---|---|
| Nb | 3.78 | 0.98 | 5.9 | 3.7 | 100 |
| CoNb | 4.39 | 1.42 | 6.75 | 3.5 | 100 |
| Ce | 1.14 | 0.2 | 1.2 | 4.2 | 65 |
| CoCe | 1.63 | 0.66 | 1.9 | 3.3 | 72 |

The quantities of fixed sulphur and residual carbon on the catalysts from Examples 24, 25, 30 and 31 sulphurised using this second method S2 are shown in Table 2. This table shows that sulphurisation method S2 could only produce low degrees of sulphurisation for catalysts containing the group VB metal, niobium, or the lanthanide group metal, cerium.

TABLE 10

| Catalyst | S content after sulphurisation (wt %) | C content after sulphurisation (wt %) | Degree of sulphurisation (%) |
|---|---|---|---|
| Nb | 0.85 | <0.05 | 14 |
| CoNb | 1.06 | <0.05 | 16 |
| Ce | 0.2 | <0.05 | 10 |
| CoCe | 0.7 | <0.05 | 26 |

EXAMPLE 34

Catalyst Sulphurisation S5 (in Accordance with the Invention)

50 g of freshly calcined catalyst was impregnated with 23 ml of a suspension of elemental sulphur in toluene, said solution containing the quantity of elemental sulphur (sublimed sulphur from AUROS, ref. 2012546) corresponding to 120% of the theoretical stoichiometry of the reaction and the quantity of powdered carbon (NORIT carbon, 211, 660 m$^2$/g from AUROS, ref. 4040250) corresponding to 110% of the theoretical stoichiometry based on the formation of $CoS$, $NbS_2$ and $Ce_2S_4$ from $CoO$, $Nb_2O_5$ and $CeO_2$ respectively depending on the type of catalyst from Examples 24, 25, 30 and 31.

The autoclave was then sealed and heated to 400° C. for 10 hours. After cooling, the autoclave was depressurised by pumping out the gases it contained, the autoclave was re-sealed and transferred to a glove box in an inert atmosphere to protect the product of the oxidation reaction from oxygen in the air. After opening, the black extrudates were recovered and preserved under inert gas in a sealed ampoule. This sulphurisation was termed S5.

The quantities of elemental sulphur and powdered carbon used for sulphurisation S5 of 50 g of each catalyst are shown in Table 11. The quantities of fixed sulphur and the quantities of residual carbon on the sulphurised catalysts are also shown in Table 11. This table shows that the sulphurisation method S5 can produce a highly satisfactory degree of sulphurisation of the group VB metal, niobium, and a medium degree of sulphurisation for the lanthanide group metal, cerium. It should also be noted that the use of an aromatic solvent, toluene, led to a higher quantity of carbon in the sulphurised catalysts.

EXAMPLE 35

Catalyst Gas Oil HDS Test

The catalysts of Examples 24 to 31, sulphurised using the three methods S4, S2 and S5 of the Examples, were compared in a gas oil hydrodesulphurisation test.

The principal characteristics of the gas oil are shown in the following table:

| Density at 15° C. | 0.856 |
|---|---|
| Refractive index at 20° C. | 1.4564 |
| Viscosity at 50° C. | 3.72 cSt |
| Sulphur | 1.57% by weight |
| Simulated distillation | |
| IP | 153° C. |
| 5% | 222° C. |
| 50% | 315° C. |
| 95% | 415° C. |
| EP | 448° C. |

The gas oil HDS test was carried out under the following operating conditions:

| Total pressure | 3 MPa |
|---|---|
| Catalyst volume | 40 cm$^3$ |
| Temperature | 340° C. |
| Hydrogen flow rate | 20 l/h |
| Feed flow rate | 80 cm$^3$/h |

For these tests, the catalysts which had been sulphurised using methods S4, S2 and S5 were charged into the catalytic reactor then wetted by the feed at a temperature of 150° C. The temperature of the unit was then raised to 340° C.

A reference test was carried out for each catalyst by charging the catalyst into the catalytic test unit and carrying out a sulphurisation step by passing the test feed defined above, to which 2% by weight of dimethyldisulphide (DMDS) had been added, under the test conditions shown above, except that the temperature was 350° C., said temperature being maintained for 10 hours. After this step, the temperature was reduced to the test temperature, 340° C., and pure feed was injected. This sulphurisation method was termed S0.

The catalytic performances of the three catalysts are shown in Tables 12 and 13 below. They are expressed as the activity, with an order of 1.5. The relationship connecting activity and conversion (%HDS) is as follows:

Activity=$[100/(100-HDS)]^{0.5}-1$

To compare the activities of Nb catalysts, in Table 12, the activity of the monometallic Nb/alumina catalyst sulphurised by method S0 was assumed to be equal to 1.

TABLE 12

Activity of Nb/alumina catalysts for gas oil hydrodesulphurisation
Relative catalyst activity

| Sulphurisation | Nb | CoNb | CoNbP | CoNbF | CoNbB | CoNbSi |
|---|---|---|---|---|---|---|
| S0 | 1 | 1.5 | — | — | — | — |
| S4 | 3.25 | 8 | 9 | 12 | 8.5 | 10 |
| S2 | 1.05 | 1.5 | — | — | — | — |
| S5 | 2.72 | 7.2 | — | — | — | — |

To compare the activities of the Ce catalysts, in Table 13, the activity of the monometallic Ce/alumina catalyst sulphurised by the S0 method was assumed to be equal to 1.

TABLE 13

Activity of Ce/alumina catalysts for gas oil hydrodesulphurisation
Relative catalyst activity

| Sulphurisation | Ce | CoCe |
|---|---|---|
| S0 | 1 | 1.3 |
| S4 | 2.25 | 4.15 |
| S2 | 0.95 | 1.05 |
| S5 | 1.93 | 2.86 |

It can be seen from Tables 12 and 13 that the activity of the catalysts sulphurised by a mixture of powdered elemental sulphur and powdered carbon, S4, was better than the catalysts sulphurised by the mixture of gas oil and DMDS (S0) or sulphurised by $H_2S$ in the gas phase (S2). The catalysts sulphurised by method S5, i.e., with the suspension of elemental sulphur in toluene, also performed better than S0 or S2. This effect could be due to a better dispersion of the sulphide phase formed because of the presence from the start of sulphurisation of the carbon powder which acts as a mild reducing agent compared with the hydrogen usually used, as in sulphurisation methods S0 and S2. The sulphurisation process of the present invention can thus produce sulphurised catalysts with improved catalytic properties. It can also be seen that the performances of the metallic catalysts are improved by the presence of the group VIII element. The sulphurisation method of the invention can thus also produce multimetallic sulphide phases supported on alumina with improved catalytic properties.

It can also be seen that activities of the catalysts containing the group VB element and group VIII element are improved by the presence of the element selected from the group formed by P, B, Si, F.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding U.S. application Ser. No. 09/344,345 and U.S. application Ser. No. 09/344,347, and priority applications are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst containing a multimetallic mixed suiphide phase comprising (a) sulphur (b) and at least one element A selected from the group consisting of group IIIB, including the lanthanides and actinides, group IVB and mixtures thereof and (c) at least one element B selected from the group consisting of group VIIB, group VIII and mixtures thereof, said sulfur being present in a quantity higher than the quantity corresponding to 40% of the stoichiometric quantity of sulfur in multimetallic sulfide compounds of elements from groups IIIB, IYB, VIIB and VIII wherein the catalyst is treated with a sulfur source comprising elemental sulfur.

2. A catalyst according to claim 1, further comprising at least one group VB element or group VIB element.

3. A catalyst according to claim 1, comprising sulphur in a quantity higher than the quantity corresponding to 50% of the stoichiometric quantity of sulphur in multimetallic sulphide compounds of elements from groups IIIB, IVB, VIIB and VIII.

4. A catalyst according to claim 1, further comprising at least one porous oxide matrix comprising at least one member selected from the group consisting of silica, alumina and silica-alumina.

5. A catalyst according to claim 1, further comprising at least one zeolite or non zeolite molecular sieve optionally present with a matrix.

6. A catalyst according to claim 1, further comprising at least one element selected from the group consisting of P, B and Si.

7. A catalyst according to claim 1, further comprising at least one group VIIA element.

8. A catalyst according to claim 1, in which element B is selected from the group consisting of iron, cobalt, nickel and rhenium.

9. A catalyst according to claim 1 in which element A is titanium or cerium.

10. A bulk catalyst according to claim 1 comprising, by weight with respect to the total catalyst weight:
    0.01% to 40% of at least one element A;
    0.01% to 30% of at least one element B;
    0.001% to 30% of sulphur; the catalyst optionally containing:
        0 to 30% of at least one group VB element or group VIB element;
        0 to 20% of at least one element selected from boron, silicon and phosphorus;
        0 to 20% of at least one group VIIA element.

11. A supported catalyst according to claim 1 comprising, by weight with respect to the total catalyst weight:
    0.01% to 40% of at least one element A;
    0.01% to 30% of at least one element B;
    0.1% to 99% of at least one support comprising at least one porous oxide matrix selected from the group consisting of silica, alumina and silica-alumina;
    0.001% to 30% of sulphur; the catalyst optionally containing:
        0 to 90% of a zeolite;
        0 to 30% of at least one group VB element or group VIB element;
        0 to 20% of at least one element selected from the group consisting of boron, silicon and phosphorus;
        0 to 20% of at least one element selected from group VIIA.

12. A catalyst according to claim 6, further comprising at least one group VIIA element.

13. A catalyst according to claim 12, further comprising at least one zeolite or non zeolitic molecular sieve.

14. A process for preparing a catalyst according to claim 1, comprising sulfurizing a precursor of the catalyst according to claim 2 with at least one compound combining sulfur and carbon and not containing hydrogen.

15. A process according to claim 14, characterized in that the following steps are carried out:
   aa) forming a reaction mixture in one or more steps, which mixture comprises: a powder or mixture of powders containing at least one element selected from group IIIB, including the lanthanides and actinides, or group IVB or mixtures thereof; at least one element selected from elements from group VIIB or group VIII or mixtures thereof; at least one compound of sulphur and of carbon containing no hydrogen; optionally at least one solid source of carbon; and optionally at least one solid source of sulphur;
   bb) maintaining the reaction mixture obtained after step aa) at a heating temperature of more than 40° C. at a pressure of over 0.01 MPa in a reactor.

16. A process according to claim 14, characterized in that the compound of sulphur and of carbon containing no hydrogen is selected from at least carbon disulphide $CS_2$, carbon oxysulphide COS, and carbon sulphide CS.

17. A process according to claim 15 in which the second step bb) comprises heating the mixture formed in the first step to a temperature in the range 40° C. to 1000° C.

18. A process according to claim 15, in which the reaction mixture of step aa) comprises at least one porous amorphous oxide matrix selected from the group consisting of silica, alumina and silica-alumina.

19. A process according to claim 18, in which the matrix is pre-impregnated with at least one salt of at least one transition metal and/or rare earth metal, optionally at least one salt containing at least one group VB element or group VIB element, optionally at least one salt containing at least one element selected from the group consisting of P, B and Si, optionally at least one group VIIA anion and in which an intermediate catalyst drying step is carried out between each impregnation step.

20. A process according to claim 18, in which element A and element B are introduced into the selected matrix by one or more ion exchange operations using at least one solution containing at least one precursor salt of said elements.

21. A process according to claim 14, in which a sealed reactor is used.

22. A process according to claim 17, wherein the heating temperature is in the range of 60° C. to 700° C.

23. A catalyst containing at least one porous substantially amorphous matrix, and a sulphide phase comprising (a) sulfur and (b) at least one sulphide of at least one element A selected from the group consisting of elements from group TUB, including the lanthanides and actinides, group IVB and group VB and mixtures thereof, the quantity of sulphur in the catalyst being over 40% of the quantity of sulphur corresponding to the stoichiometric quantity of sulphur in the sulphides of elements IIIB, IVB and VB wherein the catalyst is treated with a sulfur source comprising elemental sulfur.

24. A catalyst according to claim 23, further comprising a metal selected from group VIII.

25. A catalyst according to claim 24, comprising at least one group VIII metal selected from iron, cobalt and nickel.

26. A catalyst according to claim 23, further comprising at least one element selected from the group formed by P, B and Si.

27. A catalyst according to claim 23, further comprising at least one group VIIA element.

28. A catalyst according to claim 23, further comprising at least one zeolite.

29. A catalyst according to claim 23, comprising, by weight:
   0.01% to 40% of at least one element A;
   0.1% to 99% of at least one support selected from the group formed by amorphous matrices and low crystallinity matrices;
   0.001% to 30% of sulphur;
   0 to 30% of at least one group VIII metal;
   0 to 90% of a zeolite;
   0 to 40% of at least one element selected from the group formed by boron, silicon and phosphorus;
   0 to 20% of at least one element selected from group VIIA.

30. A catalyst according to claim 24, further comprising at least one element selected from the group formed by P, B, Si.

31. A catalyst according to claim 24, further comprising at least one group VIIA metal.

32. A catalyst according to claim 30, further comprising at least one group VIIA metal.

33. A process for preparing a catalyst according to claim 23, comprising the following steps:
   a) forming a reaction mixture which comprises: a powder or mixture of powders containing at least one element selected from group IIIB, including the lanthanides and actinides, group P/B, and group VB, at least one porous matrix which is a substantially amorphous crystallinity oxide matrix, optionally associated with a zeolitic or non zeolitic molecular sieve, optionally at least one group VIII element, optionally at least one source of an element selected from the group formed by P, B and Si, optionally at least one source of anions from group VITA, at least one source of elemental sulphur, and at least one source of carbon and optionally water;
   b) maintaining the reaction mixture obtained after step a) at a heating temperature of more than 40° C. at a pressure of over 0.01 MPa in a reactor.

* * * * *

UNITED STATES PATENT AND TRADEMARK OFFICE
CERTIFICATE OF CORRECTION

PATENT NO. : 6,562,752 B2
DATED : May 13, 2003
INVENTOR(S) : Kasztelan.

It is certified that error appears in the above-identified patent and that said Letters Patent is hereby corrected as shown below:

Title page,
Item [57], Abstract, line 60, reads "form," should read -- from --
Line 68, reads "MB," should read -- IIIB --

Column 26,
Line 2, reads "suiphide," should read -- sulphide --
Line 11, reads "IYB," should read -- IVB --

Column 27,
Line 55, reads "TUB," should read -- IIIB --

Column 28,
Line 43, reads "P/B," should read -- IVB --
Line 49, reads "VITA," should read -- VIIA --

Signed and Sealed this

Twenty-fifth Day of May, 2004

JON W. DUDAS
*Acting Director of the United States Patent and Trademark Office*